(12) United States Patent
Hayashi

(10) Patent No.: US 12,204,319 B2
(45) Date of Patent: Jan. 21, 2025

(54) COMMUNICATION DEVICE, INDUSTRIAL MACHINE, AND COMMUNICATION-QUALITY-DETERMINING METHOD

(71) Applicant: FANUC CORPORATION, Minamitsuru-gun (JP)

(72) Inventor: Takurou Hayashi, Yamanashi-ken (JP)

(73) Assignee: FANUC CORPORATION, Yamanashi-ken (JP)

( * ) Notice: Subject to any disclaimer, the term of this patent is extended or adjusted under 35 U.S.C. 154(b) by 390 days.

(21) Appl. No.: 17/791,117

(22) PCT Filed: Jan. 5, 2021

(86) PCT No.: PCT/JP2021/000111
§ 371 (c)(1),
(2) Date: Jul. 6, 2022

(87) PCT Pub. No.: WO2021/141026
PCT Pub. Date: Jul. 15, 2021

(65) Prior Publication Data
US 2023/0034831 A1 Feb. 2, 2023

(30) Foreign Application Priority Data
Jan. 8, 2020 (JP) .................................. 2020-001328

(51) Int. Cl.
*G05B 19/418* (2006.01)
*H04B 3/462* (2015.01)
*H04L 1/00* (2006.01)

(52) U.S. Cl.
CPC ......... *G05B 19/4185* (2013.01); *H04B 3/462* (2013.01); *H04L 1/00* (2013.01); *H04L 1/0026* (2013.01)

(58) Field of Classification Search
CPC ....... G05B 19/4185; H04B 3/462; H04L 1/00; H04L 1/0026
See application file for complete search history.

(56) References Cited

U.S. PATENT DOCUMENTS 6,331,999 B1 * 12/2001 Ducaroir ................. H04L 1/205
375/376
2006/0076982 A1 * 4/2006 Kobayashi .......... G11B 20/1403
(Continued)

FOREIGN PATENT DOCUMENTS

CN 107925558 A 4/2018
JP H06-326756 A 11/1994
(Continued)

OTHER PUBLICATIONS

International Search Report (ISR) (PCT Form PCT/ISA/210), in PCT/JP2021/000111, dated Mar. 30, 2021.

*Primary Examiner* — Freshteh N Aghdam
(74) *Attorney, Agent, or Firm* — Sughrue Mion, PLLC

(57) ABSTRACT

The present invention provides a communication device, an industrial machine, and a communication-quality-determining method. A communication device is provided with: a transmission unit for transmitting a serial signal; a first phase difference determination unit for determining a first phase difference which is a phase difference between a first reference clock signal having the same period as the 1-bit period of a serial transmission signal which is the serial signal transmitted from the transmission unit and an edge of the serial transmission signal transmitted from the transmission unit; and a determination unit for determining that there is an abnormality with the serial transmission signal transmitted from the transmission unit when the first phase difference exceeds a first phase difference threshold.

17 Claims, 12 Drawing Sheets

(56) References Cited

U.S. PATENT DOCUMENTS

| | | | |
|---|---|---|---|
| 2007/0019773 A1* | 1/2007 | Zhou | H03D 7/125 |
| | | | 375/373 |
| 2007/0172014 A1* | 7/2007 | Moriwaki | H03L 7/087 |
| | | | 375/376 |

FOREIGN PATENT DOCUMENTS

| | | |
|---|---|---|
| JP | 2003-265810 A | 9/2003 |
| JP | 2006-164425 A | 6/2006 |
| JP | 2010-004144 A | 1/2010 |
| JP | 2010-074808 A | 4/2010 |
| JP | 2011-103545 A | 5/2011 |
| JP | 2016-201687 A | 12/2016 |
| WO | WO 02/095947 A1 | 11/2002 |

* cited by examiner

COMMUNICATION DEVICE, INDUSTRIAL MACHINE, AND COMMUNICATION-QUALITY-DETERMINING METHOD

TECHNICAL FIELD

The present invention relates to a communication device, an industrial machine, and a communication quality determination method (communication-quality-determining method).

BACKGROUND ART

In JP 2003-265810 A, it is disclosed that a noise level in a serial communication line is detected by a noise detector which is provided on a main substrate, and, based on the noise level detected by the noise detector, a noise level of the serial communication line is determined by a determination unit.

SUMMARY OF THE INVENTION

However, a technology that can contribute to a more accurate evaluation of the communication quality has been awaited.

An object of the present invention is to provide a communication device, an industrial machine, and a communication quality determination method that are capable of contributing to an accurate evaluation of the communication quality.

A communication device according to one aspect of the present invention includes a transmission unit configured to transmit a serial signal, a first phase difference determination unit configured to determine a first phase difference which is a phase difference between a first reference clock signal having a same period as a period of one bit of a serial transmission signal that is the serial signal transmitted from the transmission unit, and an edge of the serial transmission signal transmitted from the transmission unit, and a determination unit configured to determine that there is an abnormality in the serial transmission signal transmitted from the transmission unit, in a case that the first phase difference has exceeded a first phase difference threshold value.

An industrial machine according to another aspect of the present invention is equipped with the communication device as described above.

A communication quality determination method according to another aspect of the present invention includes a transmission step of transmitting a serial signal from a transmission unit, a first phase difference determination step of determining a first phase difference which is a phase difference between a first reference clock signal having a same period as a period of one bit of a serial transmission signal that is the serial signal transmitted in the transmission step, and an edge of the serial transmission signal transmitted from the transmission unit, and a determination step of determining that there is an abnormality in the serial transmission signal transmitted in the transmission step, in a case that the first phase difference has exceeded a first phase difference threshold value.

According to the present invention, it is possible to provide the communication device, the industrial machine, and the communication quality determination method which are capable of contributing to an accurate evaluation of the communication quality.

DESCRIPTION OF THE INVENTION

Hereinafter, preferred embodiments of a communication device, an industrial machine, and a communication quality determination method according to the present invention will be described in detail with reference to the accompanying drawings.

First Embodiment

Figure 1:
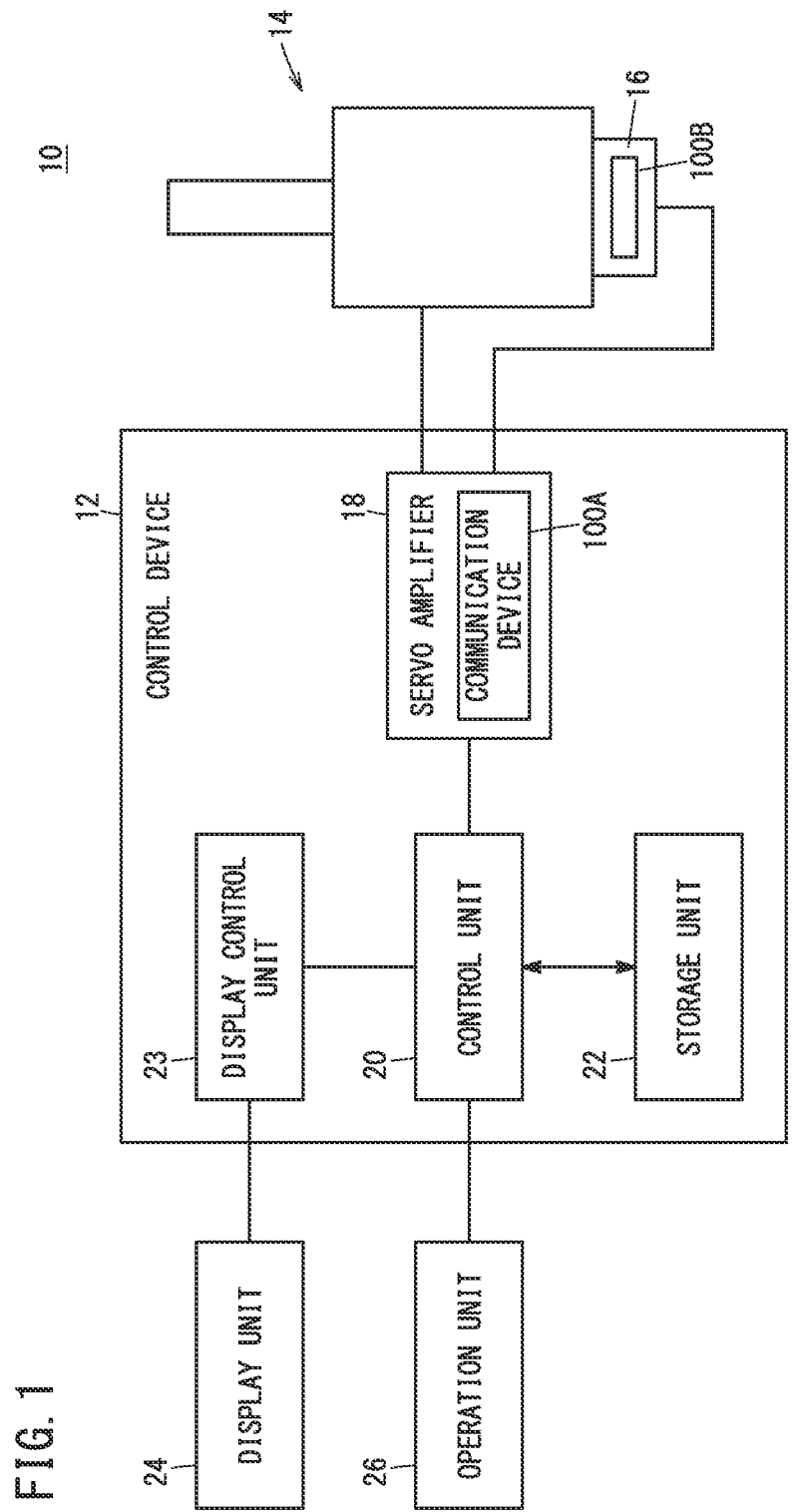
FIG. 1 is a block diagram showing an industrial machine according to a first embodiment.

A communication device, an industrial machine, and a communication quality determination method according to a first embodiment will be described with reference to FIGS. 1 to 6. FIG. 1 is a block diagram showing an industrial machine according to the present embodiment. As examples of such an industrial machine 10 according to the present embodiment, although not limited to such devices, there may be cited machine tools, robots, and the like.

As shown in FIG. 1, the industrial machine 10 is equipped with a control device 12. A servo amplifier 18, a control unit 20, a storage unit 22, and a display control unit 23 are provided in the control device 12. Moreover, although constituent elements other than these are provided in the control device 12, in order to simplify the description, constituent elements other than those components mentioned above will be omitted. Further, in this instance, although an exemplary case is described in which the servo amplifier 18 is provided in the industrial machine 10, the present invention is not necessarily limited to this feature. For example, in the case that a spindle motor is used as a drive motor, a spindle amplifier or the like may be used instead of the servo amplifier 18.

The control unit 20 controls the industrial machine 10 in its entirety. The control unit 20 may be configured, for example, by a CPU (Central Processing Unit) or the like, however, the control unit is not limited to this feature.

The storage unit 22 is equipped with a volatile memory and a nonvolatile memory, neither of which are shown. As examples of the volatile memory, there may be cited a RAM (Random Access Memory) or the like. As examples of the nonvolatile memory, there may be cited a ROM (Read Only Memory), a flash memory, or the like. Programs, data, and the like may be stored in the storage unit 22.

The display control unit 23 is capable of carrying out display control with respect to a later-described display unit 24. The display control unit 23 may display information supplied thereto from the control unit 20 on a display screen of the display unit 24.

The industrial machine 10 is further equipped with a servo motor 14. The servo motor 14 is capable of being driven by a drive current supplied from the servo amplifier 18. Although a single servo motor 14 is shown in FIG. 1, the industrial machine 10 may be equipped with a plurality of servo motors 14. Further, in this instance, although an exemplary case is described in which the servo motor 14 is provided as a drive motor in the industrial machine 10, the present invention is not necessarily limited to this feature. For example, a spindle motor or the like may be used instead of the servo motor 14.

An encoder (absolute encoder) 16 is provided in the servo motor 14. The encoder 16 is capable of detecting a rotational position of the output shaft of the servo motor 14. The encoder 16 is equipped with a communication device 100B that serves to carry out communications with a communication device 100A that is provided in the servo amplifier 18. The communication device 100B is capable of outputting a signal to indicate the rotational position of the output shaft of the servo motor 14 to the communication device 100A. The servo motor 14 may be feedback controlled based on signals that are output from the encoder 16, i.e., based on signals that are output from the communication device 100B. Further, in this instance, although an exemplary case is described in which an absolute encoder is used as the encoder 16, the present invention is not necessarily limited to this feature. For example, an incremental encoder may also be used as the encoder 16.

The servo amplifier (servo driver) 18 may supply a drive current for rotationally driving the servo motor 14, to the servo motor 14. The communication device 100A, which carries out communications with the communication device 100B, is provided in the servo amplifier 18. Serial communications may be carried out between the communication device 100A and the communication device 100B. Although, as an example of such a serial communication standard, there may be cited RS-485 or the like, the present invention is not necessarily limited to this feature.

The display unit (display device) 24, and an operation unit 26 may be connected to the control device 12. An operation screen in order to perform inputting of operations with respect to the industrial machine 10 may be displayed on a non-illustrated display screen provided in the display unit 24. Further, on the display screen of the display unit 24, there may be displayed information indicating determination results made by a later-described determination unit 116 (see FIG. 2). A liquid crystal display device or the like can be used as the display unit 24, however, the display unit 24 is not limited to this feature.

The user is capable of inputting operations with respect to the industrial machine 10 by operating the operation unit 26.

As the operation unit 26, there may be used a mouse or the like, although the present invention is not limited to this feature. In the case that the display unit 24 is provided with a touch panel, such a touch panel is capable of functioning as the operation unit 26.

Moreover, although constituent elements other than those described above are provided in the industrial machine 10, in order to simplify the description, constituent elements other than those components mentioned above will be omitted.

Figure 2:
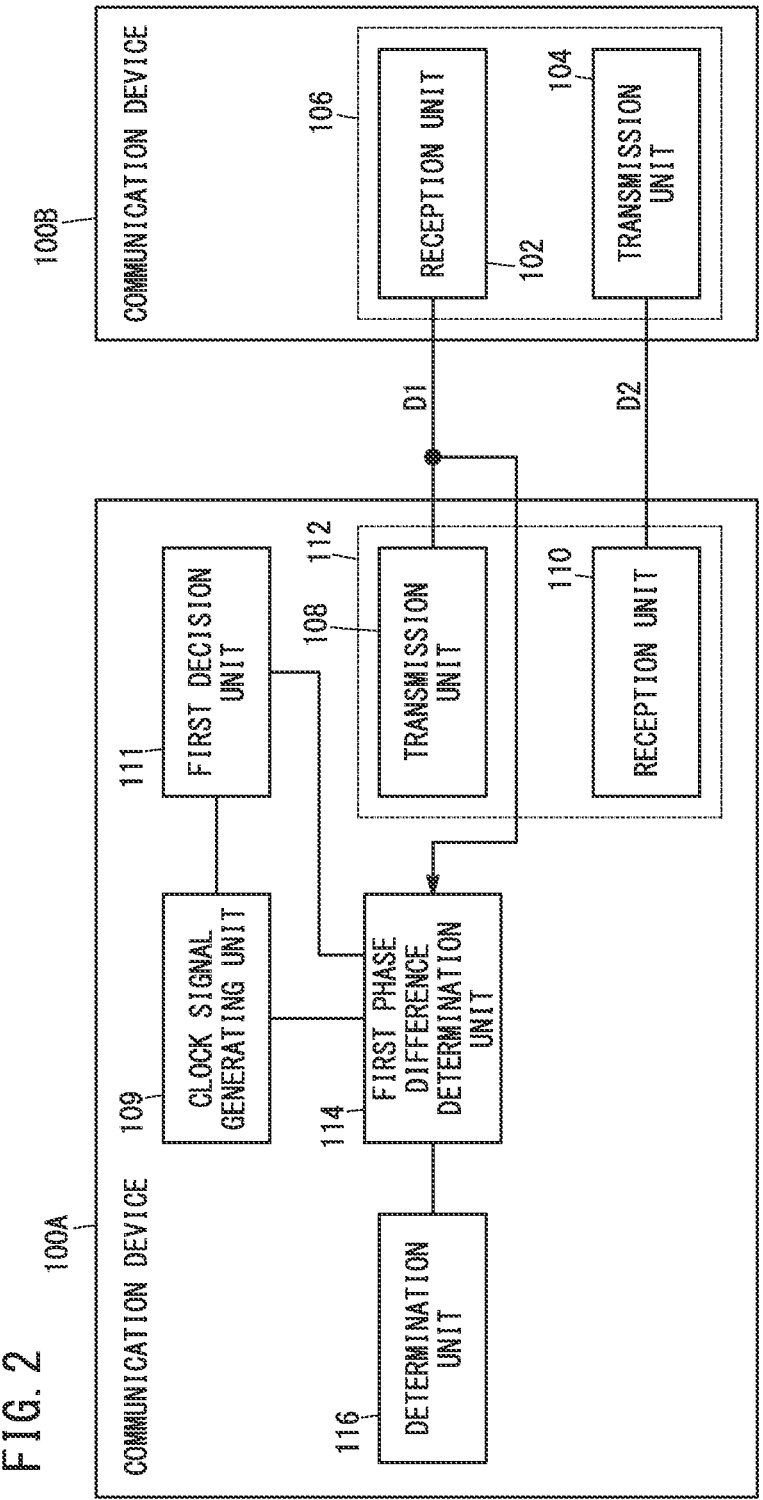
FIG. 2 is a block diagram showing a communication device according to the first embodiment.

FIG. 2 is a block diagram showing a communication device according to the present embodiment.

As described above, the communication device 100A is provided in the servo amplifier 18. As described above, the communication device 100B is provided in the encoder 16. Moreover, in this instance, although an exemplary case is described in which the communication device 100A is provided in the servo amplifier 18, and the communication device 100B is provided in the encoder 16, the present invention is not necessarily limited to this feature.

The communication device 100B is equipped with a reception unit (reception circuit) 102 and a transmission unit (transmission circuit) 104. A transceiver 106 is constituted by the reception unit 102 and the transmission unit 104. Moreover, although constituent elements other than these are provided in the communication device 100B, in order to simplify the description, constituent elements other than those components will be omitted in FIG. 2.

A transmission unit (transmission circuit) 108 and a reception unit (reception circuit) 110 are provided in the communication device 100A. A transceiver 112 is constituted by the transmission unit 108 and the reception unit 110. The transmission unit 108 may transmit a serial signal (a serial transmission signal) D1, i.e., serial data, to the reception unit 102 that is provided in the communication device 100B. The reception unit 110 may receive a serial signal (a serial reception signal) D2, serial data, transmitted from the transmission unit 104 that is provided in the communication device 100B.

Figure 3:
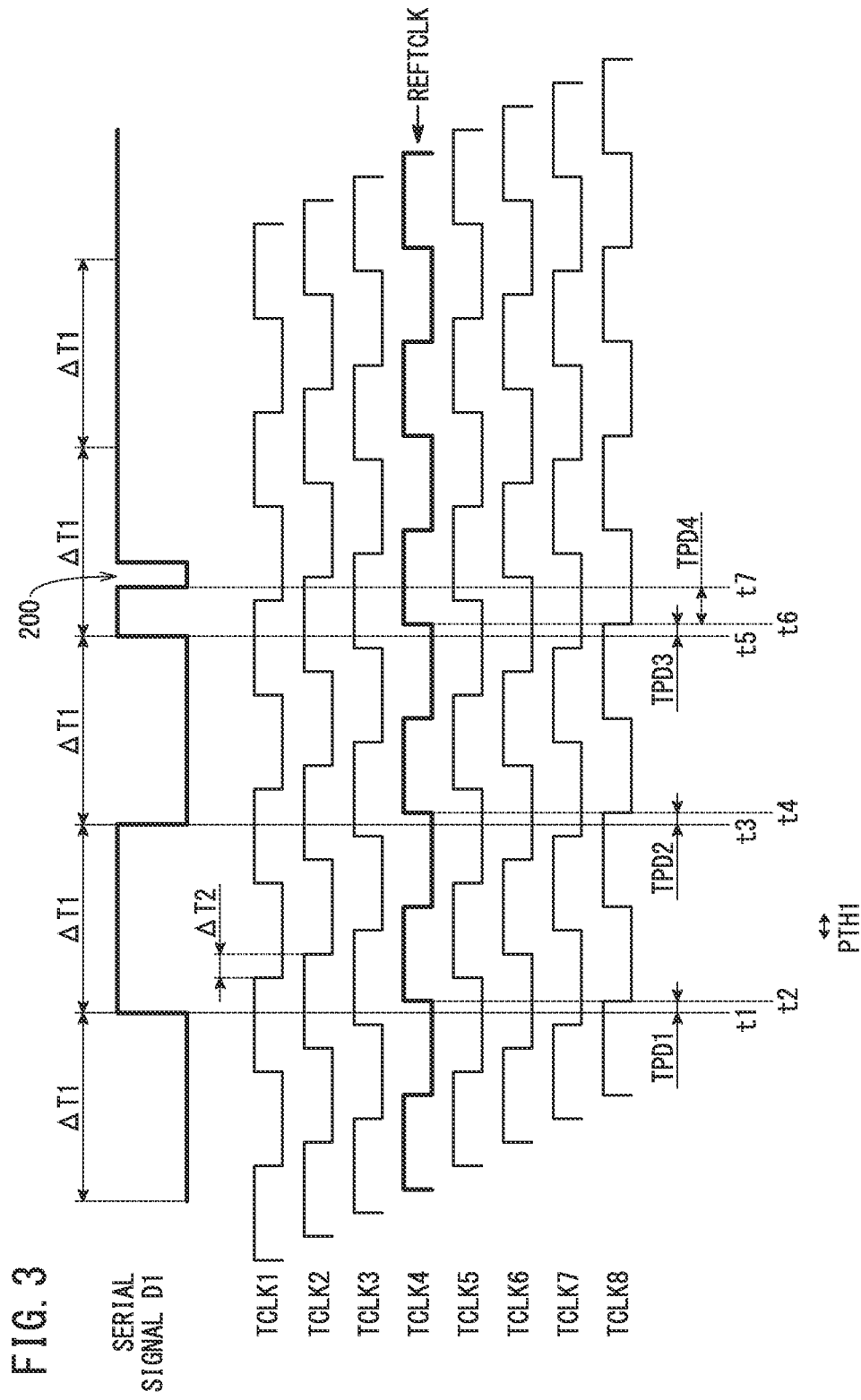
FIG. 3 is a time chart showing an example of a serial signal and clock signals.

The communication device 100A is further equipped with a clock signal generating unit (clock signal generating circuit) 109. As shown in FIG. 3, the clock signal generating unit 109 is capable of generating a plurality of clock signals TCLK1 to TCLK8. FIG. 3 is a time chart showing an example of the serial signal and the clock signals. A serial signal D1 output from the transmission unit 108, and more specifically, a serial signal D1 input to a later-described first phase difference determination unit 114, is shown in FIG. 3. The periods of the plurality of clock signals TCLK1 to TCLK8 are set to be equal to each other. The periods of the clock signals TCLK1 to TCLK8 are set to be equivalent to a period $\Delta T1$ of one bit of the serial signal D1. The timings of rising edges of the plurality of clock signals TCLK1 to TCLK8 are each shifted by a time period $\Delta T2$. In other words, the plurality of clock signals TCLK1 to TCLK8 have a phase difference from each other corresponding to the time period $\Delta T2$. The period $\Delta T1$ of one bit of the serial signal D1 is an integral multiple of the time period $\Delta T2$ corresponding to the phase difference between the plurality of clock signals TCLK1 to TCLK8. In this instance, the period $\Delta T1$ of one bit of the serial signal D1 is eight times the time period $\Delta T2$ corresponding to the phase difference between the plurality of clock signals TCLK1 to TCLK8. In the foregoing manner, the plurality of clock signals TCLK1 to TCLK8 have a phase difference corresponding to the time period $\Delta T2$, which is shorter than the period $\Delta T1$ of one bit of the serial signal D1.

The clock signal TCLK1 can be generated by using, for example, a non-illustrated crystal oscillator. The clock signals (phase shifted clock signals) TCLK2 to TCLK8 can be generated from the clock signal TCLK1 using, for example, a non-illustrated phase shift circuit (clock phase shift circuit). When the clock signals are described in general, the reference numeral TCLK is used, and when individual ones of the clock signals are described, the reference numerals TCLK1 to TCLK8 are used. In this instance, although an exemplary case is described in which eight of the clock signals TCLK are generated by the clock signal generating unit 109, the number of the clock signals TCLK generated by the clock signal generating unit 109 is not limited to eight.

The transmission unit 108 transmits the serial signal D1, for example, in accordance with the clock signal TCLK1. For example, the serial signal D1 is output from the transmission unit 108 in accordance with a rising edge of the clock signal TCLK1. As described above, the serial signal D1 output from the transmission unit 108 is received by the reception unit 102 that is provided in the communication device 100B. Further, the serial signal D1 output from the transmission unit 108 is input to a later-described first phase difference determination unit 114 that is provided in the communication device 100A. More specifically, the serial signal D1 output from the transmission unit 108 is input to the first phase difference determination unit 114 via a non-illustrated reception circuit or the like.

As can be understood from FIG. 3, a certain delayed time exists between the timing of the rising edge of the clock signal TCLK1 and the timing of the edge of the serial signal D1 that is input to the first phase difference determination unit 114. Such a delayed time is not necessarily a uniform value in all of the communication devices 100A that are mass-produced. Further, such a delayed time may vary due to changes in the ambient temperature or the like. Therefore, as will be described later, an appropriate clock signal TCLK from among the plurality of clock signals TCLK1 to TCLK8 having phase differences that differ from each other is decided as a first reference clock signal REFTCLK. As will be discussed later, whether or not there is an abnormality in the serial signal D1 transmitted from the transmission unit 108 is determined based on the phase difference between the edge of the serial signal D1 that is input to the first phase difference determination unit 114 and the first reference clock signal REFTCLK. It should be noted that the edges of the serial signal D1 include a rising edge and a falling edge.

A first decision unit (first decision circuit) 111 is further provided in the communication device 100A. The first decision unit 111, the later-described first phase difference determination unit 114, and the later-described determination unit 116 may be configured by one or more processors (microprocessors), however, the present invention is not limited to this feature. As such processors, for example, a CPU, a DSP (Digital Signal Processor), or the like can be used. As noted previously, a certain delayed time exists between the timing of the rising edge of the clock signal TCLK1 and the timing of the edge of the serial signal D1 that is input to the first phase difference determination unit 114. In order to accurately determine whether or not there is an abnormality in the serial signal D1 output from the transmission unit 108, the first decision unit 111 decides, as the first reference clock signal REFTCLK, an appropriate clock signal TCLK from among the plurality of clock signals TCLK1 to TCLK8. As the first reference clock signal REFTCLK, the first decision unit 111 may decide, for example, a clock signal TCLK positioned immediately before or immediately after the edge of the serial signal D1. The first reference clock signal REFTCLK serves for the purpose of determining whether or not there is an abnormality in the serial signal D1 output from the transmission unit 108. In this instance, an exemplary case is described in which a clock signal TCLK, which is positioned immediately after the edge of the serial signal D1, is decided as being the first reference clock signal REFTCLK. In the example shown in FIG. 3, the clock signal TCLK, which is positioned immediately after the edge of the serial signal D1, is the clock signal TCLK4. Accordingly, in the example shown in FIG. 3, the clock signal TCLK4 can be decided as being the first reference clock signal REFTCLK.

The clock signal TCLK positioned immediately after the edge of the serial signal D1 may fluctuate due to jitter or the like. Accordingly, when the first reference clock signal REFTCLK is decided, it is preferable to decide, as the first reference clock signal REFTCLK, a clock signal TCLK whose frequency of occurrence of signal occurring immediately after the edge of the serial signal D1 is sufficiently high. More specifically, it is preferable that a clock signal TCLK that has the frequency of occurrence being greater than or equal to a frequency threshold value should be decided as the first reference clock signal REFTCLK. The frequency threshold value can be, for example, on the order of 80%, but is not limited to this feature. For example, the clock signal TCLK positioned immediately after an nth edge of the serial signal D1 is the clock signal TCLK4. The clock signal TCLK positioned immediately after an (n+1)th edge of the serial signal D1 is the clock signal TCLK4. The clock signal TCLK positioned immediately after an (n+2)th edge of the serial signal D1 is the clock signal TCLK5. The clock signal TCLK positioned immediately after an (n+3)th edge of the serial signal D1 is the clock signal TCLK4. The clock signal TCLK positioned immediately after an (n+4)th edge of the serial signal D1 is the clock signal TCLK4. In the case that the frequency threshold value is 80%, the clock signal TCLK that has the frequency of occurrence being equal to or greater than the frequency threshold value is the clock signal TCLK4. In such a case, the first decision unit 111 can decide the clock signal TCLK4 as being the first reference clock signal REFTCLK.

Moreover, as noted previously, although an exemplary case is described in which a clock signal TCLK whose frequency of occurrence of signal occurring immediately after the edge of the serial signal D1 is greater than or equal to the frequency threshold value is decided as being the first reference clock signal REFTCLK, the present invention is not necessarily limited to this feature. A clock signal TCLK whose frequency of occurrence of signal positioned immediately after the edge of the serial signal D1 is the highest may be decided as being the first reference clock signal REFTCLK.

As noted previously, the period of the clock signals TCLK is set to be equivalent to a period $\Delta T1$ of one bit of the serial signal D1. Therefore, it is not necessary to frequently change the first reference clock signal REFTCLK. However, the delayed time, which exists between the timing of the rising edge of the clock signals TCLK and the timing of the edge of the serial signal D1 that is input to the first phase difference determination unit 114, may be varied due to changes in temperature or the like. Therefore, there are cases in which another clock signal TCLK, which differs from the clock signal TCLK that was previously decided as being the first reference clock signal REFTCLK, may be positioned immediately after the edge of the serial signal D1. In such a case, the other clock signal TCLK, which has become positioned immediately after the edge of the serial signal D1, is newly decided as being the first reference clock signal REFTCLK. Such a change in the first reference clock signal REFTCLK may occur at a certain frequency.

The first phase difference determination unit (first phase difference determination circuit) 114 is further provided in the communication device 100A. The first phase difference determination unit 114 is capable of determining a first phase difference TPD1 to TPD4, which is a phase difference between an edge of the serial signal D1 transmitted from the transmission unit 108 and the first reference clock signal REFTCLK. In this instance, although an exemplary case is described in which the phase difference between the edge of the serial signal D1 and a rising edge of the first reference clock signal REFTCLK is determined, the present invention is not necessarily limited to this feature. A phase difference between the edge of the serial signal D1 and a falling edge of the first reference clock signal REFTCLK may also be determined. When the first phase differences are described in general, the reference numeral TPD is used, and when individual ones of the first phase differences are described, the reference numerals TPD1 to TPD4 are used. The first phase difference determination unit 114 may supply the first phase difference TPD obtained by such a determination to the later-described determination unit 116.

The determination unit (determination circuit) 116 is further provided in the communication device 100A. In the case that the first phase difference TPD has exceeded the first phase difference threshold value PTH1, the determination unit 116 may determine that there is an abnormality in the serial signal D1 transmitted from the transmission unit 108. The determination unit 116 may supply, to the control unit 20, information indicating whether or not there is an abnormality in the serial signal D1 transmitted from the transmission unit 108.

The determination unit 116 is capable of determining a degree of the communication abnormality based on the number of times that the first phase difference TPD has exceeded the first phase difference threshold value PTH1 within a predetermined time period. The determination unit 116 may supply, to the control unit 20, information indicating the degree of the communication abnormality.

The first phase difference threshold value PTH1 is variable. The first phase difference threshold value PTH1 can be adjusted by the user. The user is capable of adjusting the first phase difference threshold value PTH1 via the operation unit 26.

In the case that the serial signal D1 output from the transmission unit 108, i.e., the serial signal D1 input to the first phase difference determination unit 114, changes as shown in FIG. 3, the following determination is carried out by the determination unit 116.

The timing t1 indicates the timing of a rising edge of the serial signal D1. More specifically, at the timing t1, the serial signal D1 transitions from a low level to a high level.

The timing t2 indicates the timing of a rising edge of the first reference clock signal REFTCLK. More specifically, the timing t2 indicates the timing of the rising edge of the first reference clock signal REFTCLK close to the timing t1. At the timing t2, the first reference clock signal REFTCLK transitions from a low level to a high level.

In the example shown in FIG. 3, a phase difference between the timing t1 of the rising edge of the serial signal D1 and the timing t2 of the rising edge of the first reference clock signal REFTCLK, i.e., a first phase difference TPD1, is less than a first phase difference threshold value PTH1. In the case that the first phase difference TPD is less than the first phase difference threshold value PTH1, the determination unit 116 determines that there is not an abnormality in the serial signal D1 transmitted from the transmission unit 108.

The timing t3 indicates the timing of a falling edge of the serial signal D1. More specifically, at the timing t3, the serial signal D1 transitions from a high level to a low level.

The timing t4 indicates the timing of a rising edge of the first reference clock signal REFTCLK. More specifically, the timing t4 indicates the timing of the rising edge of the first reference clock signal REFTCLK close to the timing t3. At the timing t4, the first reference clock signal REFTCLK transitions from a low level to a high level.

In the example shown in FIG. 3, a phase difference between the timing t3 of the falling edge of the serial signal D1 and the timing t4 of the rising edge of the first reference clock signal REFTCLK, i.e., a first phase difference TPD2, is less than a first phase difference threshold value PTH1. As described above, in the case that the first phase difference TPD is less than the first phase difference threshold value PTH1, the determination unit 116 determines that there is not an abnormality in the serial signal D1 transmitted from the transmission unit 108.

The timing t5 indicates the timing of a rising edge of the serial signal D1. More specifically, at the timing t5, the serial signal D1 transitions from a low level to a high level.

The timing t6 indicates the timing of a rising edge of the first reference clock signal REFTCLK. More specifically, the timing t6 indicates the timing of the rising edge of the first reference clock signal REFTCLK close to the timing t5. At the timing t6, the first reference clock signal REFTCLK transitions from a low level to a high level.

In the example shown in FIG. 3, a phase difference between the timing t5 of the rising edge of the serial signal D1 and the timing t6 of the rising edge of the first reference clock signal REFTCLK, a first phase difference TPD3, is less than a first phase difference threshold value PTH1. In the case that the first phase difference TPD is less than the first phase difference threshold value PTH1, the determination unit 116 determines that there is not an abnormality in the serial signal D1 transmitted from the transmission unit 108.

The timing t7 indicates the timing of a falling edge of the serial signal D1. More specifically, at the timing t7, the serial signal D1 transitions from a high level to a low level.

The timing of the rising edge of the first reference clock signal REFTCLK close to the timing t7 of the falling edge of the serial signal D1 is t6. In the example shown in FIG. 3, a phase difference between the timing t7 of the falling edge of the serial signal D1 and the timing t6 of the rising edge of the first reference clock signal REFTCLK, i.e., a first phase difference TPD4, is greater than or equal to the first phase difference threshold value PTH1. In the example shown in FIG. 3, the reason why the first phase difference TPD4 is greater than or equal to the first phase difference threshold value PTH1 is because a transmission pathway between the transmission unit 108 and the reception unit 102 is affected by the influence of disturbance noise, and an inversion 200 has occurred in the serial signal D1 transmitted from the transmission unit 108. In the case that the first phase difference TPD is greater than or equal to the first phase difference threshold value PTH1, the determination unit 116 determines that there is an abnormality in the serial signal D1 transmitted from the transmission unit 108.

Figure 4:
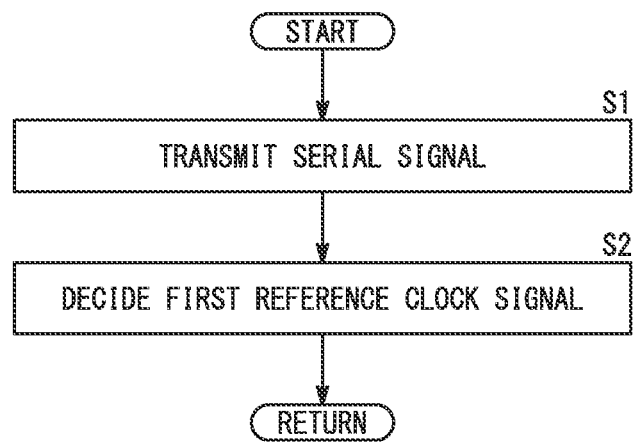
FIG. 4 is a flowchart showing an example of operations of the communication device according to the first embodiment.

A description will be given below with reference to FIG. 4 concerning an example of operations of the communication device according to the present embodiment. FIG. 4 is a flowchart showing an example of operations of the communication device according to the present embodiment. Operations in order to decide the first reference clock signal REFTCLK are shown in FIG. 4.

In step S1, the transmission unit 108 transmits the serial signal D1. Thereafter, the process transitions to step S2.

In step S2, from among the plurality of clock signals TCLK, the first decision unit 111 decides a clock signal TCLK that is positioned immediately after the edge of the serial signal D1, as being the first reference clock signal REFTCLK. Although a clock signal TCLK whose frequency of occurrence of signal positioned immediately after the edge of the serial signal D1 is greater than or equal to the frequency threshold value, can be decided as being the first reference clock signal REFTCLK, the present invention is not necessarily limited to this feature. A clock signal TCLK whose frequency of occurrence of signal positioned immediately after the edge of the serial signal D1 is the highest may be decided as being the first reference clock signal REFTCLK.

Figure 5:
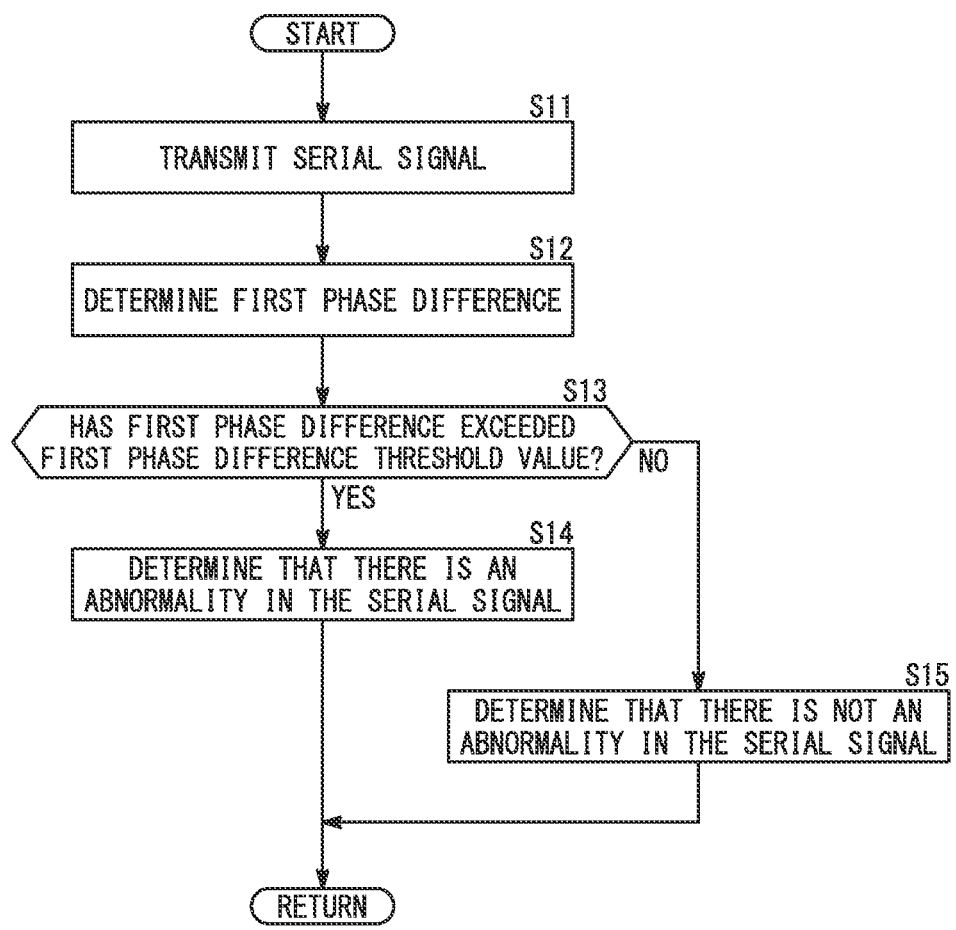
FIG. 5 is a flowchart showing an example of operations of the communication device according to the first embodiment.

Next, a description will be given below with reference to FIG. 5 concerning operations of the communication device according to the present embodiment. FIG. 5 is a flowchart showing an example of operations of the communication device according to the present embodiment. FIG. 5 shows an example of determining whether or not there is an abnormality in the serial signal D1 transmitted from the transmission unit 108. The operations as shown in FIG. 5 are repeatedly carried out.

In step S11, the transmission unit 108 transmits the serial signal D1.

In step S12, the first phase difference determination unit 114 determines the first phase difference TPD between the timing of the rising edge of the clock signal TCLK and the timing of the edge of the serial signal D1.

In step S13, the determination unit 116 determines whether or not the first phase difference TPD has exceeded the first phase difference threshold value PTH1. In the case that the first phase difference TPD has exceeded the first phase difference threshold value PTH1 (YES in step S13), the process transitions to step S14. In the case that the first phase difference TPD is less than or equal to the first phase difference threshold value PTH1 (NO in step S13), the process transitions to step S15.

In step S14, the determination unit 116 determines that there is an abnormality in the serial signal D1 transmitted from the transmission unit 108.

In step S15, the determination unit 116 determines that there is not an abnormality in the serial signal D1 transmitted from the transmission unit 108. In this manner, the process shown in FIG. 5 is carried out.

Figure 6:
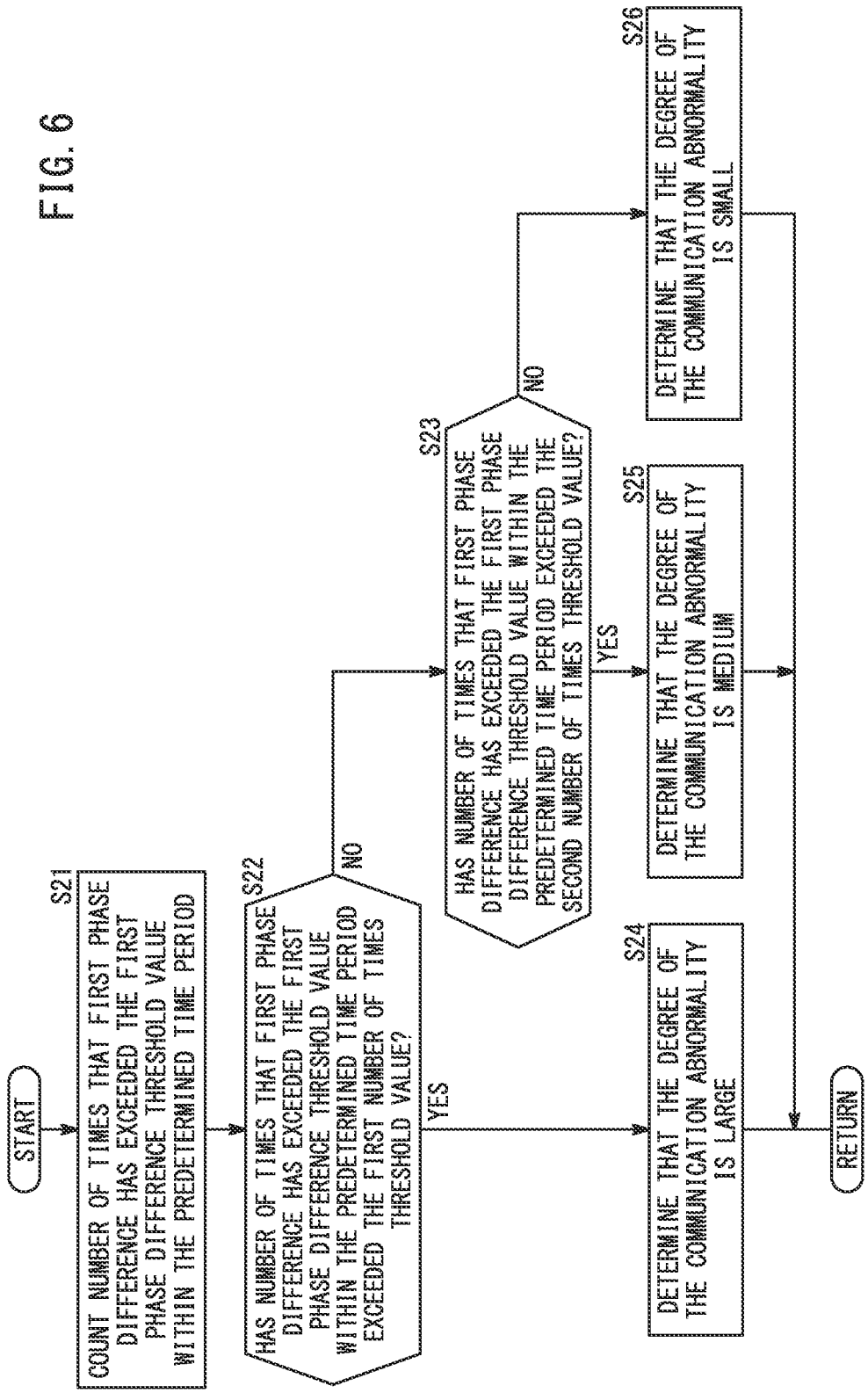
FIG. 6 is a flowchart showing an example of operations of the communication device according to the first embodiment.

Next, a description will be given below with reference to FIG. 6 concerning an example of operations of the communication device according to the present embodiment. FIG. 6 is a flowchart showing an example of operations of the communication device according to the present embodiment. An example of determining a degree of the communication abnormality based on the number of times that the first phase difference TPD has exceeded the first phase difference threshold value PTH1 within a predetermined time period is shown in FIG. 6. Moreover, in this instance, although an exemplary case is described in which the degree of the communication abnormality is classified into three categories of large, medium, and small, the present invention is not necessarily limited to this feature.

In step S21, the determination unit 116 counts the number of times that the first phase difference TPD has exceeded the first phase difference threshold value PTH1 within the predetermined time period.

In step S22, the determination unit 116 determines whether or not the number of times that the first phase difference TPD has exceeded the first phase difference threshold value PTH1 within the predetermined time period has exceeded a first number of times threshold value NTH1. In the case that the number of times that the first phase difference TPD has exceeded the first phase difference threshold value PTH1 within the predetermined time period has exceeded the first number of times threshold value NTH1 (YES in step S22), the process transitions to step S24. In the case that the number of times that the first phase difference TPD has exceeded the first phase difference threshold value PTH1 within the predetermined time period is less than or equal to the first number of times threshold value NTH1 (NO in step S22), the process transitions to step S23.

In step S23, the determination unit 116 determines whether or not the number of times that the first phase difference TPD has exceeded the first phase difference threshold value PTH1 within the predetermined time period has exceeded a second number of times threshold value NTH2. The second number of times threshold value NTH2 is smaller than the first number of times threshold value NTH1. In the case that the number of times that the first phase difference TPD has exceeded the first phase difference threshold value PTH1 within the predetermined time period has exceeded the second number of times threshold value NTH2 (YES in step S23), the process transitions to step S25. In the case that the number of times that the first phase difference TPD has exceeded the first phase difference threshold value PTH1 within the predetermined time period is less than or equal to the second number of times threshold value NTH2 (NO in step S23), the process transitions to step S26.

In step S24, the determination unit 116 determines that the degree of the communication abnormality is large.

In step S25, the determination unit 116 determines that the degree of the communication abnormality is medium.

In step S26, the determination unit 116 determines that the degree of the communication abnormality is small.

In this manner, the process shown in FIG. 6 is brought to an end.

As described above, according to the present embodiment, in the case that the first phase difference TPD, which is a phase difference between the edge of the serial signal D1 transmitted from the transmission unit 108 and the clock signal TCLK, has exceeded the first phase difference threshold value PTH1, it is determined that there is an abnormality in the serial signal D1 transmitted from the transmission unit 108. According to the present embodiment, it is possible to contribute to an accurate evaluation of the communication quality.

Second Embodiment

Figure 7:
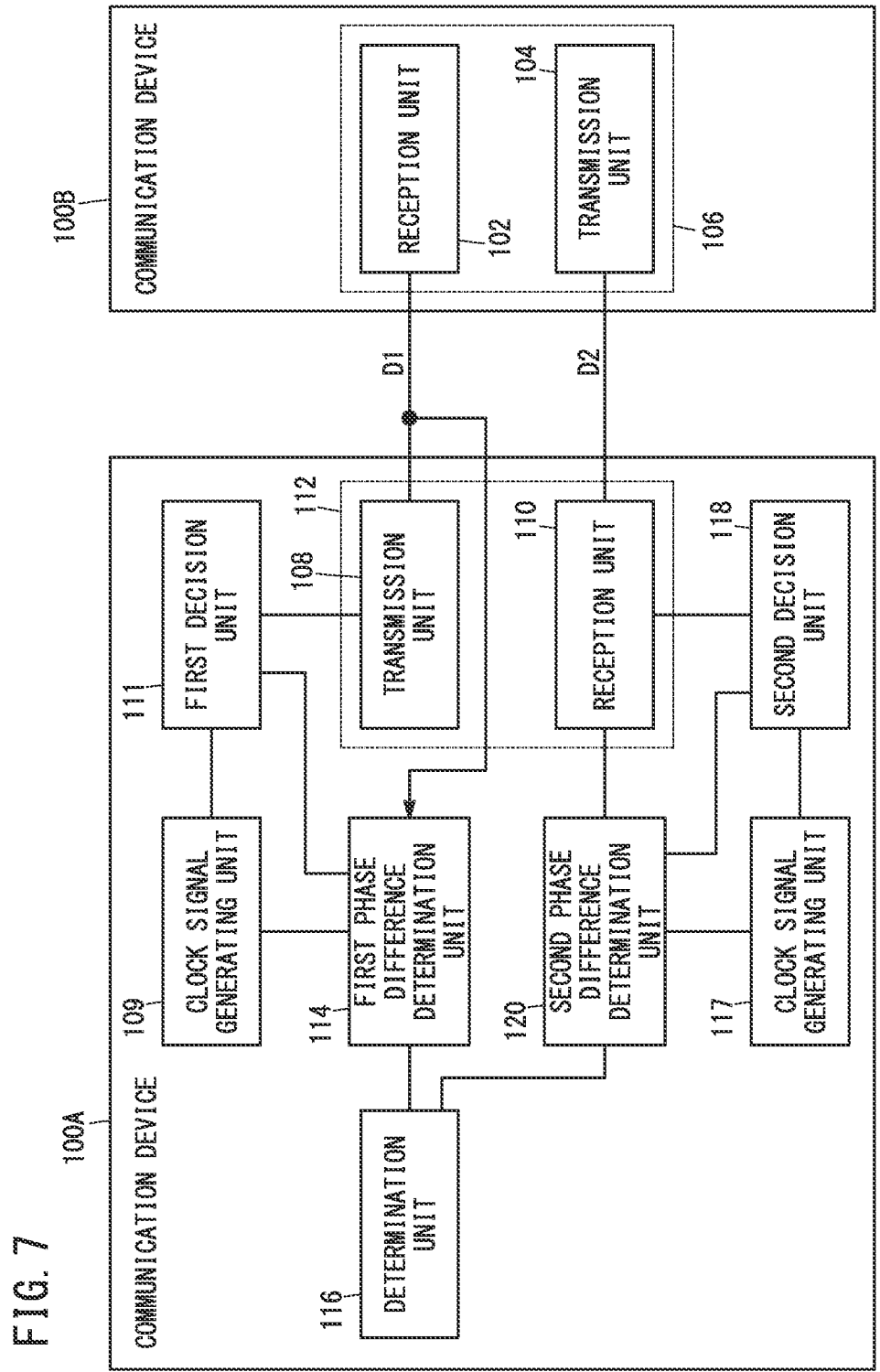
FIG. 7 is a block diagram showing a communication device according to a second embodiment.

A communication device, an industrial machine, and a communication quality determination method according to a second embodiment will be described with reference to FIGS. 7 to 12. FIG. 7 is a block diagram showing a communication device according to the present embodiment. The same constituent elements as those of the communication device and the like according to the first embodiment shown in FIGS. 1 to 6 are designated by the same reference numerals, and description thereof is either omitted or described in a simplified manner.

In the communication device 100A according to the present embodiment, it is further determined whether or not the second phase difference RPD1 to RPD4, which is a phase difference between the serial signal D2 received by the reception unit 110 and the second reference clock signal REFRCLK, has exceeded the second phase difference threshold value PTH2. When the second phase differences are described in general, the reference numeral RPD is used, and when individual ones of the second phase differences are described, the reference numerals RPD1 to RPD4 are used.

Figure 8:
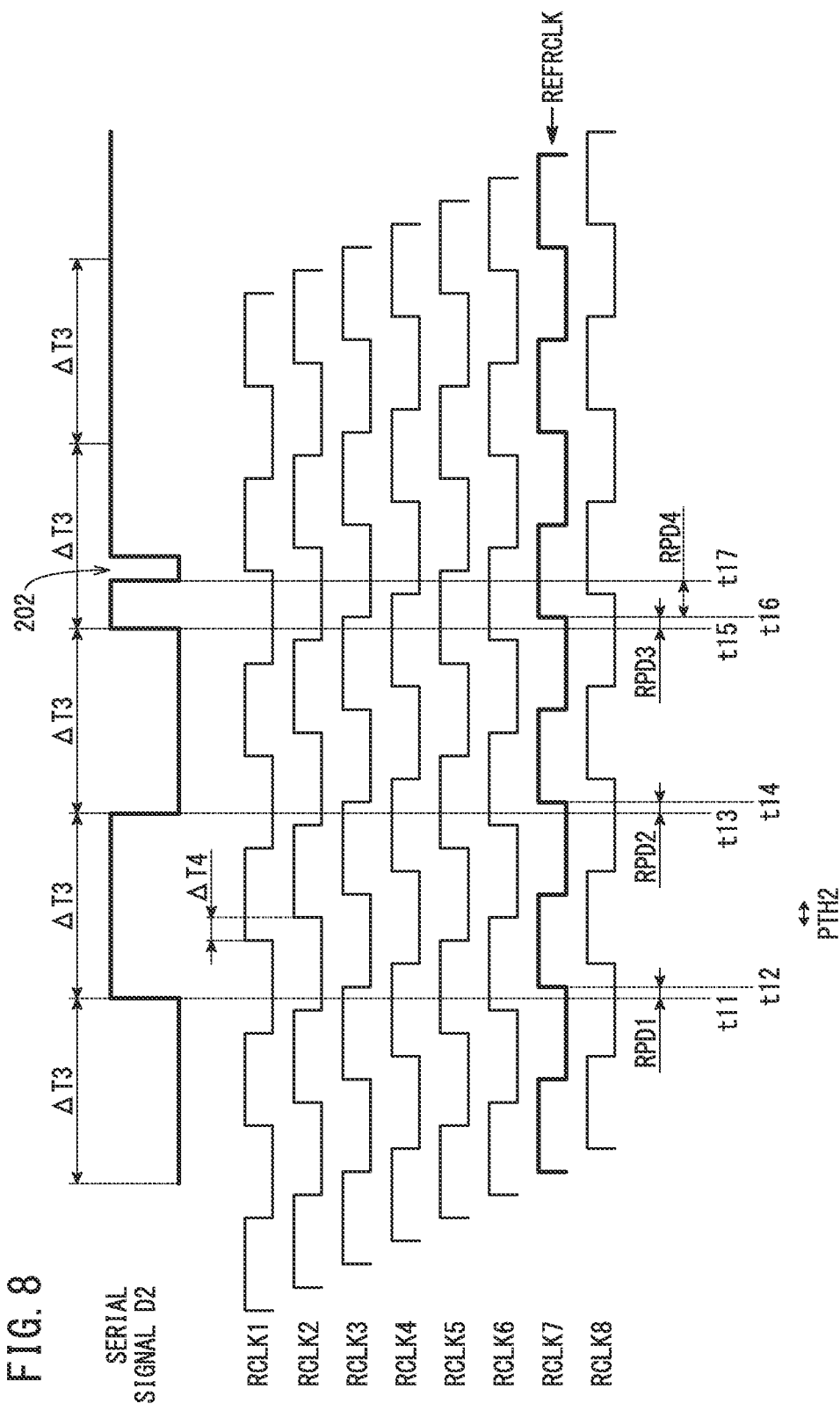
FIG. 8 is a time chart showing an example of a serial signal and clock signals.

As shown in FIG. 7, the communication device 100A is further equipped with a clock signal generating unit (clock signal generating circuit) 117. As shown in FIG. 8, the clock signal generating unit 117 is capable of generating a plurality of clock signals RCLK1 to RCLK8. FIG. 8 is a time chart showing an example of the serial signal and the clock signals. The serial signal D2 input to the reception unit 110 is shown in FIG. 8. Periods of the plurality of clock signals RCLK1 to RCLK8 are set to be equal to each other. The periods of the clock signals RCLK1 to RCLK8 are set to be equivalent to a period ΔT3 of one bit of the serial signal D2. The timings of rising edges of the plurality of clock signals RCLK1 to RCLK8 are each shifted by a time period ΔT4. In other words, the plurality of clock signals RCLK1 to RCLK8 have a phase difference from each other corresponding to the time period ΔT4. The period ΔT3 of one bit of the serial signal D2 is an integral multiple of the time period ΔT4 corresponding to the phase difference between the plurality of clock signals RCLK1 to RCLK8. In this instance, the period ΔT3 of one bit of the serial signal D2 is eight times the time period ΔT4 corresponding to the phase difference between the plurality of clock signals RCLK1 to RCLK8. In the foregoing manner, the plurality of clock signals RCLK1 to RCLK8 have a phase difference corresponding to the time period ΔT4, which is shorter than the period ΔT3 of one bit of the serial signal D2.

The clock signal RCLK1 can be generated by using, for example, a non-illustrated crystal oscillator. The clock signals (phase shifted clock signals) RCLK2 to RCLK8 can be generated from the clock signal RCLK1 using, for example, a non-illustrated phase shift circuit (clock phase shift circuit). When the clock signals are described in general, the reference numeral RCLK is used, and when individual ones of the clock signals are described, the reference numerals RCLK1 to RCLK8 are used. In this instance, although an exemplary case is described in which eight of the clock signals RCLK are generated by the clock signal generating unit 117, the number of the clock signals RCLK generated by the clock signal generating unit 117 is not limited to eight.

The plurality of clock signals RCLK are not synchronized with the serial signal D2 supplied from the transmission unit 104 that is provided in the communication device 100B. The periods of the clock signals RCLK are set to be equivalent to a period ΔT3 of one bit of the serial signal D2.

A second decision unit (decision circuit) 118 is further provided in the communication device 100A. Although the first decision unit 111, the first phase difference determination unit 114, the determination unit 116, the second decision unit 118, and a later-described second phase difference determination unit 120 may be configured by one or more processors, the present invention is not limited to this feature. As such processors, for example, a CPU, a DSP, or the like can be used. From among the plurality of clock signals RCLK, the second decision unit 118 is capable of deciding, as a second reference clock signal REFRCLK, a clock signal RCLK positioned immediately before or immediately after the edge of the serial signal D2. The second reference clock signal REFRCLK serves for the purpose of determining the second phase difference RPD of the serial signal D2. As noted previously, the plurality of clock signals RCLK generated by the clock signal generating unit 117 are out of phase with each other, and are not synchronized with the serial signal D2. In order to make it possible to accurately determine the second phase difference RPD of the serial signal D2, the second decision unit 118 decides, as the second reference clock signal REFRCLK, the clock signal RCLK positioned immediately before or immediately after the edge of the serial signal D2. In the example shown in FIG. 8, the clock signal RCLK, which is positioned immediately before or immediately after the edge of the serial signal D2, is the clock signal RCLK7. Accordingly, in the example shown in FIG. 8, the clock signal RCLK7 can be decided as being the second reference clock signal REFRCLK. It should be noted that the edges of the serial signal D2 include a rising edge and a falling edge.

The clock signal RCLK positioned immediately after the edge of the serial signal D2 may fluctuate due to jitter or the like. Accordingly, when the second reference clock signal REFRCLK is decided, it is preferable to decide, as the second reference clock signal REFRCLK, a clock signal RCLK whose frequency of occurrence of signal positioned immediately after the edge of the serial signal D2 is sufficiently high. More specifically, it is preferable that a clock signal RCLK that has the frequency of occurrence being greater than or equal to a frequency threshold value should be decided as the second reference clock signal REFRCLK. The frequency threshold value can be, for example, on the order of 80%, but is not limited to this feature. For example, the clock signal RCLK positioned immediately after an nth edge of the serial signal D2 is the clock signal RCLK7. The clock signal RCLK positioned immediately after an (n+1)th edge of the serial signal D2 is the clock signal RCLK7. The clock signal RCLK positioned immediately after an (n+2)th edge of the serial signal D2 is the clock signal RCLK8. The clock signal RCLK positioned immediately after an (n+3)th edge of the serial signal D2 is the clock signal RCLK7. The clock signal RCLK positioned immediately after an (n+4)th edge of the serial signal D2 is the clock signal RCLK7. In the case that the frequency threshold value is 80%, the clock signal RCLK that has the frequency of occurrence being equal to or greater than the frequency threshold value is the clock signal RCLK7. In such a case, the second decision unit 118 can decide the clock signal RCLK7 as being the second reference clock signal REFRCLK.

Moreover, as noted previously, although an exemplary case is described in which a clock signal RCLK whose frequency of occurrence of signal positioned immediately after the edge of the serial signal D2 is greater than or equal to the frequency threshold value is decided as being the second reference clock signal REFRCLK, the present invention is not necessarily limited to this feature. A clock signal RCLK whose frequency of occurrence of signal positioned immediately after the edge of the serial signal D2 is the highest may be decided as being the second reference clock signal REFRCLK.

As noted previously, the period of the clock signals RCLK is set to be equivalent to a period ΔT3 of one bit of the serial signal D2. Therefore, it is not necessary to frequently change the second reference clock signal REFRCLK. However, a slight error may occur between the period of the clock signal RCLK and the period of one bit of the serial signal D2. Therefore, there are cases in which the second reference clock signal REFRCLK, which was decided in the past by the second decision unit 118, is no longer positioned immediately before or immediately after the edge of the serial signal D2. In such a case, another clock signal RCLK, which has become positioned immediately after the edge of the serial signal D2, is newly decided as being the second reference clock signal REFRCLK. Such a change in the second reference clock signal REFRCLK may occur at a certain frequency.

The second phase difference determination unit (second phase difference determination circuit) 120 is further provided in the communication device 100A. The second phase difference determination unit 120 is capable of determining a second phase difference RPD, which is a phase difference between the edge of the serial signal D2 received by the reception unit 110 and the clock signal RCLK (see FIG. 8). The second phase difference determination unit 120 may supply the second phase difference RPD obtained by such a determination, to the determination unit 116.

In the case that the second phase difference RPD has exceeded the second phase difference threshold value PTH2, the determination unit 116 may determine that there is an abnormality in the serial signal D2 received by the reception unit 110. The determination unit 116 may supply, to the control unit 20, information indicating whether or not there is an abnormality in the serial signal D2 received by the reception unit 110.

In the case that the serial signal D2 input to the reception unit 110 changes as shown in FIG. 8, the following determination is carried out by the determination unit 116.

The timing t11 indicates the timing of a rising edge of the serial signal D2. More specifically, at the timing t11, the serial signal D2 transitions from a low level to a high level.

The timing t12 indicates the timing of a rising edge of the second reference clock signal REFRCLK. More specifically, the timing t12 indicates the timing of the rising edge of the second reference clock signal REFRCLK close to the timing t11. At the timing t12, the second reference clock signal REFRCLK transitions from a low level to a high level. Moreover, an exemplary case in which the clock signal RCLK7 is decided as being the second reference clock signal REFRCLK is shown in FIG. 8.

In the example shown in FIG. 8, a phase difference between the timing t11 of the rising edge of the serial signal D2 and the timing t12 of the rising edge of the second reference clock signal REFRCLK, i.e., a second phase difference RPD1, is less than a second phase difference threshold value PTH2. In the case that the second phase difference RPD is less than the second phase difference threshold value PTH2, the determination unit 116 determines that there is not an abnormality in the serial signal D2 received by the reception unit 110.

The timing t13 indicates the timing of a falling edge of the serial signal D2. More specifically, at the timing t13, the serial signal D2 transitions from a high level to a low level.

The timing t14 indicates the timing of a rising edge of the second reference clock signal REFRCLK. More specifically, the timing t14 indicates the timing of the rising edge of the second reference clock signal REFRCLK close to the timing t13. At the timing t14, the second reference clock signal REFRCLK transitions from a low level to a high level.

In the example shown in FIG. 8, a phase difference between the timing t13 of the falling edge of the serial signal D2 and the timing t14 of the rising edge of the second reference clock signal REFRCLK, i.e., a second phase difference RPD2, is less than a second phase difference threshold value PTH2. As noted previously, in the case that the second phase difference RPD is less than the second phase difference threshold value PTH2, the determination unit 116 determines that there is not an abnormality in the serial signal D2 received by the reception unit 110.

The timing t15 indicates the timing of the rising edge of the serial signal D2. More specifically, at the timing t15, the serial signal D2 transitions from a low level to a high level.

The timing t16 indicates the timing of a rising edge of the second reference clock signal REFRCLK. More specifically, the timing t16 indicates the timing of the rising edge of the second reference clock signal REFRCLK close to the timing t15. At the timing t16, the second reference clock signal REFRCLK transitions from a low level to a high level.

In the example shown in FIG. 8, a phase difference between the timing t15 of the rising edge of the serial signal D2 and the timing t16 of the rising edge of the second reference clock signal REFRCLK, i.e., a second phase difference RPD3, is less than a second phase difference threshold value PTH2. As noted previously, in the case that the second phase difference RPD is less than the second phase difference threshold value PTH2, the determination unit 116 determines that there is not an abnormality in the serial signal D2 received by the reception unit 110.

The timing t17 indicates the timing of a falling edge of the serial signal D2. More specifically, at the timing t17, the serial signal D2 transitions from a high level to a low level.

The timing of the rising edge of the second reference clock signal REFRCLK close to the timing t17 of the falling edge of the serial signal D2 is t16. In the example shown in FIG. 8, a phase difference between the timing t16 of the rising edge of the second reference clock signal REFRCLK and the timing t17 of the falling edge of the serial signal D2, i.e., a second phase difference RPD4, is greater than or equal to the second phase difference threshold value PTH2. In the example shown in FIG. 8, the reason why the second phase difference RPD4 is greater than or equal to the second phase difference threshold value PTH2 is because a transmission pathway between the reception unit 110 and the transmission unit 104 is affected by the influence of disturbance noise, and an inversion 202 has occurred in the serial signal D2 received by the reception unit 110. In the case that the second phase difference RPD is greater than or equal to the second phase difference threshold value PTH2, the determination unit 116 determines that there is an abnormality in the serial signal D2 received by the reception unit 110.

The determination unit 116 is capable of determining a degree of the communication abnormality based on the number of times that the second phase difference RPD has exceeded the second phase difference threshold value PTH2 within a predetermined time period. The determination unit 116 may supply, to the control unit 20, information indicating the degree of the communication abnormality.

The second phase difference threshold value PTH2 is variable. The second phase difference threshold value PTH2 can be adjusted by the user. The user is capable of adjusting the second phase difference threshold value PTH2 via the operation unit 26.

The determination unit 116 may determine the cause of the communication abnormality based on the determination result made by the first phase difference determination unit 114 and the determination result made by the second phase difference determination unit 120. In the case that the first phase difference TPD has exceeded the first phase difference threshold value PTH1, and further, the second phase difference RPD has exceeded the second phase difference threshold value PTH2, the determination unit 116 may determine that a disturbance noise is included in the cause of the communication abnormality. In the case that the first phase difference TPD has not exceeded the first phase difference threshold value PTH1, and further, the second phase difference RPD has exceeded the second phase difference threshold value PTH2, the determination unit 116 may determine that jitter is the cause of the communication abnormality.

Figure 9:
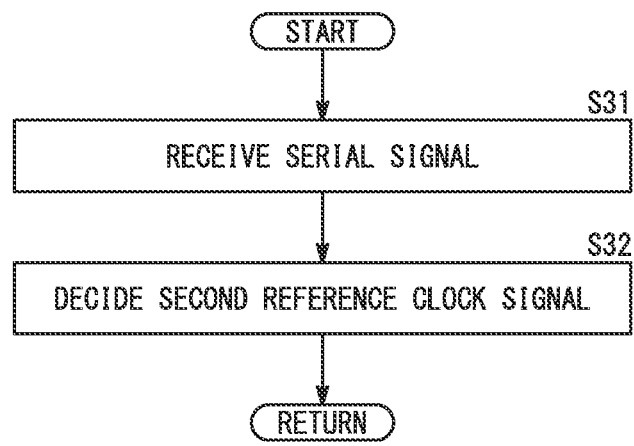
FIG. 9 is a flowchart showing an example of operations of the communication device according to the second embodiment.

A description will be given below with reference to FIG. 9 concerning an example of operations of the communication device according to the present embodiment. FIG. 9 is a flowchart showing an example of operations of the communication device according to the present embodiment. Operations in order to decide the second reference clock signal REFRCLK are shown in FIG. 9.

In step S31, the reception unit 110 receives the serial signal D2. Thereafter, the process transitions to step S32.

In step S32, from among the plurality of clock signals RCLK, the second decision unit 118 decides a clock signal RCLK that is positioned immediately after the edge of the serial signal D2, as being the second reference clock signal REFRCLK. Although a clock signal RCLK whose frequency of occurrence of signal positioned immediately after the edge of the serial signal D2 is greater than or equal to the frequency threshold value, can be decided as being the second reference clock signal REFRCLK, the present invention is not necessarily limited to this feature. A clock signal RCLK whose frequency of occurrence of signal positioned immediately after the edge of the serial signal D2 is the highest may be decided as being the second reference clock signal REFRCLK.

Figure 10:
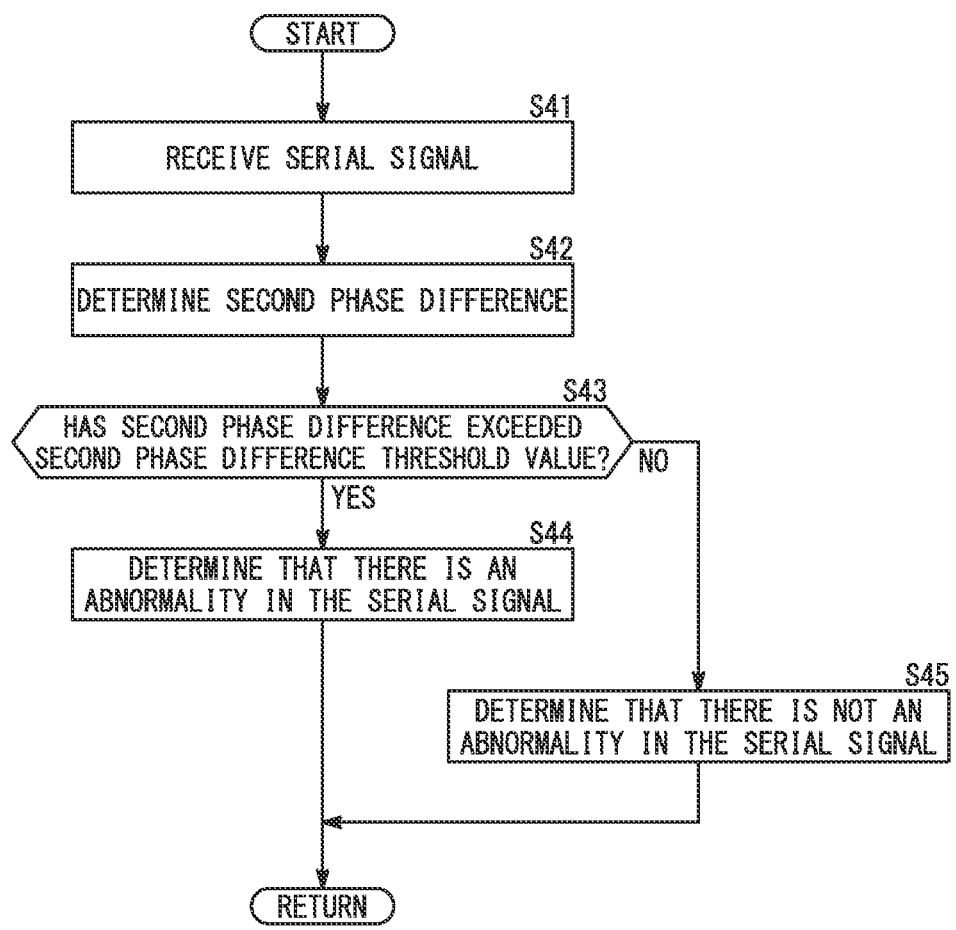
FIG. 10 is a flowchart showing an example of operations of the communication device according to the second embodiment.

Next, a description will be given below with reference to FIG. 10 concerning operations of the communication device according to the present embodiment. FIG. 10 is a flowchart showing an example of operations of the communication device according to the present embodiment. FIG. 10 shows an example of determining whether or not there is an abnormality in the serial signal D2 received by the reception unit 110. The operations as shown in FIG. 10 are repeatedly carried out.

In step S41, the reception unit 110 receives the serial signal D2.

In step S42, the second phase difference determination unit 120 determines the second phase difference RPD between the timing of the rising edge of the second reference clock signal REFRCLK and the timing of the edge of the serial signal D2.

In step S43, the determination unit 116 determines whether or not the second phase difference RPD has exceeded the second phase difference threshold value PTH2. In the case that the second phase difference RPD has exceeded the second phase difference threshold value PTH2 (YES in step S43), the process transitions to step S44. In the case that the second phase difference RPD is less than or equal to the second phase difference threshold value PTH2 (NO in step S43), the process transitions to step S45.

In step S44, the determination unit 116 determines that there is an abnormality in the serial signal D2 received by the reception unit 110.

In step S45, the determination unit 116 determines that there is not an abnormality in the serial signal D2 received by the reception unit 110. In this manner, the process shown in FIG. 10 is carried out.

Figure 11:
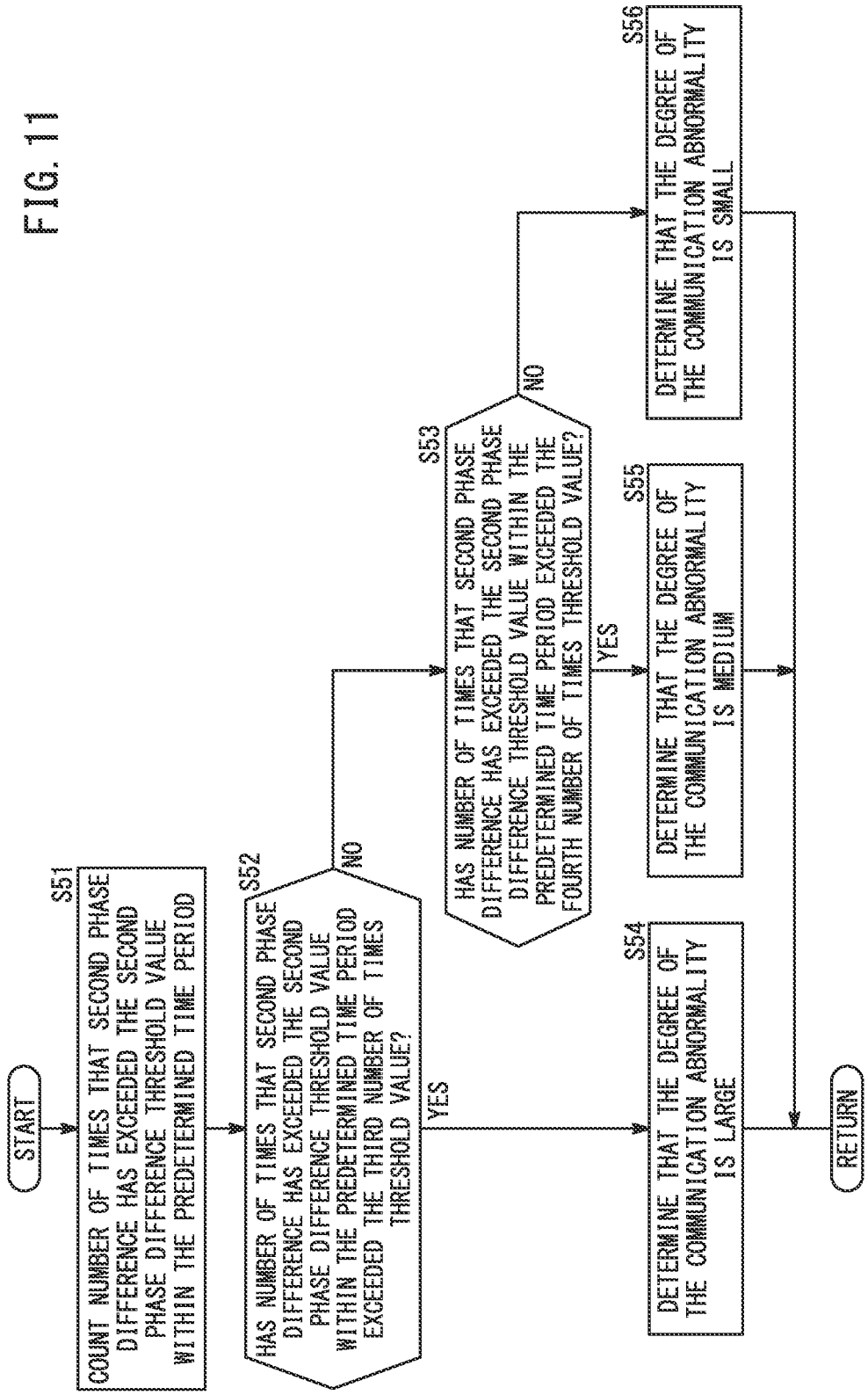
FIG. 11 is a flowchart showing an example of operations of the communication device according to the second embodiment.

Next, a description will be given below with reference to FIG. 11 concerning an example of operations of the communication device according to the present embodiment. FIG. 11 is a flowchart showing an example of operations of the communication device according to the present embodiment. An example of determining a degree of the communication abnormality based on the number of times that the second phase difference RPD has exceeded the second phase difference threshold value PTH2 within a predetermined time period is shown in FIG. 11. Moreover, in this instance, although an exemplary case is described in which the degree of the communication abnormality is classified into three categories of large, medium, and small, the present invention is not necessarily limited to this feature.

In step S51, the determination unit 116 counts the number of times that the second phase difference RPD has exceeded the second phase difference threshold value PTH2 within the predetermined time period.

In step S52, the determination unit 116 determines whether or not the number of times that the second phase difference RPD has exceeded the second phase difference threshold value PTH2 within the predetermined time period has exceeded a third number of times threshold value NTH3. In the case that the number of times that the second phase difference RPD has exceeded the second phase difference threshold value PTH2 within the predetermined time period has exceeded the third number of times threshold value NTH3 (YES in step S52), the process transitions to step S54. In the case that the number of times that the second phase difference RPD has exceeded the second phase difference threshold value PTH2 within the predetermined time period is less than or equal to the third number of times threshold value NTH3 (NO in step S52), the process transitions to step S53.

In step S53, the determination unit 116 determines whether or not the number of times that the second phase difference RPD has exceeded the second phase difference threshold value PTH2 within the predetermined time period has exceeded a fourth number of times threshold value NTH4. The fourth number of times threshold value NTH4 is smaller than the third number of times threshold value NTH3. In the case that the number of times that the second phase difference RPD has exceeded the second phase difference threshold value PTH2 within the predetermined time period has exceeded the fourth number of times threshold value NTH4 (YES in step S53), the process transitions to step S55. In the case that the number of times that the second phase difference RPD has exceeded the second phase difference threshold value PTH2 within the predetermined time period is less than or equal to the fourth number of times threshold value NTH4 (NO in step S53), the process transitions to step S56.

In step S54, the determination unit 116 determines that the degree of the communication abnormality is large.

In step S55, the determination unit 116 determines that the degree of the communication abnormality is medium.

In step S56, the determination unit 116 determines that the degree of the communication abnormality is small.

In this manner, the process shown in FIG. 11 is brought to an end.

Figure 12:
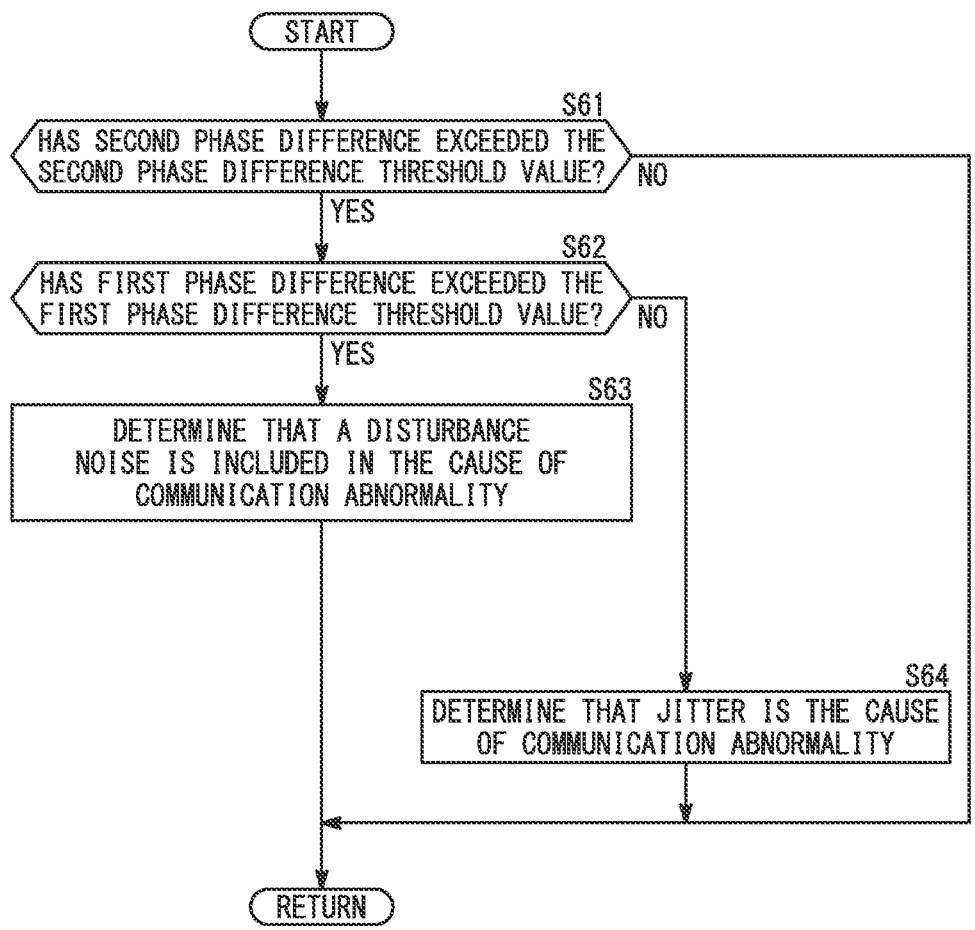
FIG. 12 is a flowchart showing an example of operations of the communication device according to the second embodiment.

Next, a description will be given below with reference to FIG. 12 concerning an example of operations of the communication device according to the present embodiment. FIG. 12 is a flowchart showing an example of operations of the communication device according to the present embodiment. An example of a case in which the cause of the communication abnormality is determined based on the determination result made by the first phase difference determination unit 114 and the determination result made by the second phase difference determination unit 120 is shown in FIG. 12.

In step S61, the determination unit 116 determines whether or not the second phase difference RPD has exceeded the second phase difference threshold value PTH2. In the case that the second phase difference RPD has exceeded the second phase difference threshold value PTH2 (YES in step S61), the process transitions to step S62. In the case that the second phase difference RPD is less than or equal to the second phase difference threshold value PTH2 (NO in step S61), the process shown in FIG. 12 is brought to an end.

In step S62, the determination unit 116 determines whether or not the first phase difference TPD has exceeded the first phase difference threshold value PTH1. In the case that the first phase difference TPD has exceeded the first phase difference threshold value PTH1 (YES in step S62), the process transitions to step S63. In the case that the first phase difference TPD is less than or equal to the first phase difference threshold value PTH1 (NO in step S62), the process transitions to step S64.

In step S63, the determination unit 116 determines that a disturbance noise is included in the cause of the communication abnormality.

In step S64, the determination unit 116 determines that jitter is the cause of the communication abnormality. In this manner, the process shown in FIG. 12 is brought to an end.

In the foregoing manner, according to the present embodiment, a determination is further made as to whether or not the second phase difference RPD in the serial signal D2 received by the reception unit 110 exceeds the second phase difference threshold value PTH2. In the case that a disturbance noise is included in the cause of the communication abnormality, not only the first phase difference TPD exceeds the first phase difference threshold value PTH1, but also the second phase difference RPD exceeds the second phase difference threshold value PTH2. In the case that the cause of the communication abnormality is jitter, although the second phase difference RPD may exceed the second phase difference threshold value PTH2, the first phase difference TPD does not exceed the first phase difference threshold value PTH1. In this manner, according to the present embodiment, it is possible to grasp the cause of the communication abnormality. In this manner, according to the present embodiment, it is possible to contribute to an accurate evaluation of the communication quality.

Although preferred embodiments of the present invention have been described above, the present invention is not limited to the above-described embodiments, and various modifications can be made thereto within a range that does not depart from the essence and gist of the present invention.

For example, in the second embodiment, although a case has been described in which the clock signal generating unit 109 and the clock signal generating unit 117 are separately provided, the present invention is not necessarily limited to this feature. In the case that the period ΔT1 of one bit of the serial signal D1 transmitted from the transmission unit 108 and the period ΔT3 of one bit of the serial signal D2 received by the reception unit 110 are the same, the following procedure may be performed. More specifically, the clock signals TCLK1 to TCLK8 generated by the clock signal generating unit 109 can be used as the clock signals RCLK1 to RCLK8. In such a case, the clock signal generating unit 109 may also serve as the clock signal generating unit 117.

The above-described embodiments can be summarized in the following manner.

The communication device (100A) is equipped with the transmission unit (108) that transmits the serial signal (D1), the first phase difference determination unit (114) that determines the first phase difference (TPD1 to TPD4) which is the phase difference between the first reference clock signal (REFTCLK) having a same period as the period (ΔT1) of one bit of the serial transmission signal that is the serial signal transmitted from the transmission unit, and the edge of the serial transmission signal transmitted from the transmission unit, and the determination unit (116) that determines that there is an abnormality in the serial transmission signal transmitted from the transmission unit, in the case that the first phase difference has exceeded the first phase difference threshold value (PTH1). In accordance with such a configuration, in the case that the phase difference between the first reference clock signal and the edge of the serial transmission signal has exceeded the first phase difference threshold value, since it is determined that there is an abnormality in the serial transmission signal, it is possible to contribute to an accurate evaluation of the communication quality.

There may further be included the first decision unit (111) that decides, as the first reference clock signal, one from among the plurality of clock signals (TCLK1 to TCLK8) each having a phase difference corresponding to the time period (ΔT2) that is shorter than the period of one bit of the serial transmission signal, the periods of the plurality of clock signals being equal to each other.

The first decision unit may decide, as the first reference clock signal, a clock signal positioned immediately before or immediately after the edge of the serial transmission signal, from among the plurality of clock signals.

The determination unit may determine a degree of the communication abnormality based on the number of times that the first phase difference has exceeded the first phase difference threshold value within the predetermined time period. In accordance with such a configuration, it is possible to more accurately grasp the degree of the communication abnormality.

The first phase difference threshold value may be variable.

There may further be provided the reception unit (110) that receives the serial signal (D2), and the second phase difference determination unit (120) that determines the second phase difference (RPD1 to RPD4) which is the phase difference between the second reference clock signal (REFRCLK) having the same period as the period (ΔT3) of one bit of the serial reception signal that is the serial signal received by the reception unit, and the edge of the serial reception signal received by the reception unit, wherein the determination unit determines that there is an abnormality in the serial reception signal received by the reception unit, in the case that the second phase difference has exceeded the second phase difference threshold value (PTH2). In accordance with such a configuration, it is possible to contribute to an accurate evaluation of the communication quality.

There may further be included the second decision unit (118) that decides, as the second reference clock signal, one from among the plurality of clock signals (RCLK1 to RCLK8) each having a phase difference corresponding to the time period (ΔT4) that is shorter than the period of one bit of the serial reception signal, the periods of the plurality of clock signals being equal to each other.

The second decision unit may decide, as the second reference clock signal, a clock signal positioned immediately before or immediately after the edge of the serial reception signal from among the plurality of clock signals.

The determination unit may determine the cause of the communication abnormality, based on the determination result made by the first phase difference determination unit and the determination result made by the second phase difference determination unit. In accordance with such a configuration, it is possible to more accurately grasp the cause of the communication abnormality.

In the case that the first phase difference has exceeded the first phase difference threshold value, and further, the second phase difference has exceeded the second phase difference threshold value, the determination unit may determine that a disturbance noise is included in the cause of the abnormality.

In the case that the first phase difference has not exceeded the first phase difference threshold value, and further, the second phase difference has exceeded the second phase difference threshold value, the determination unit may determine that the cause of the abnormality is jitter.

The second phase difference threshold value may be variable.

The determination unit may determine a degree of the communication abnormality based on the number of times that the second phase difference has exceeded the second phase difference threshold value within the predetermined time period.

The industrial machine (10) is equipped with the communication device as described above.

The communication quality determination method includes the transmission step (S11) of transmitting the serial signal from the transmission unit, the first phase difference determination step (S12) of determining the first phase difference, which is a phase difference between the first reference clock signal having the same period as the period of one bit of the serial transmission signal that is the serial signal transmitted in the transmission step, and the edge of the serial transmission signal transmitted from the transmission unit, and the determination step (S13, S14) of determining that there is an abnormality in the serial transmission signal transmitted in the transmission step, in the case that the first phase difference has exceeded the first phase difference threshold value.

The communication quality determination method may further include the reception step (S41) of receiving the serial signal by the reception unit, and the second phase difference determination step (S42) of determining the second phase difference which is a phase difference between the second reference clock signal having a same period as a period of one bit of the serial reception signal that is the serial signal received in the reception step, and the edge of the serial reception signal received by the reception unit, wherein, in the determination step (S43, S44), it may be determined that there is an abnormality in the serial reception signal received by the reception unit, in the case that the second phase difference has exceeded the second phase difference threshold value.

In the determination step (S43, S44), the cause of the communication abnormality may be determined, based on the determination result in the first phase difference determination step and the determination result in the second phase difference determination step.

The invention claimed is:

1. A communication device, comprising:
a transmission unit configured to transmit a serial signal;
a first phase difference determination unit configured to determine a first phase difference which is a phase difference between a first reference clock signal having a same period as a period of one bit of a serial transmission signal that is the serial signal transmitted from the transmission unit, and an edge of the serial transmission signal transmitted from the transmission unit; and
a determination unit configured to determine that there is an abnormality in the serial transmission signal transmitted from the transmission unit, in a case that the first phase difference has exceeded a first phase difference threshold value.

2. The communication device according to claim 1, further comprising a first decision unit configured to decide, as the first reference clock signal, one clock signal from among a plurality of clock signals each having a phase difference corresponding to a time period that is shorter than the period of one bit of the serial transmission signal, periods of the plurality of clock signals being equal to each other.

3. The communication device according to claim 2, wherein the first decision unit decides, as the first reference clock signal, a clock signal positioned immediately before or immediately after the edge of the serial transmission signal, from among the plurality of clock signals.

4. The communication device according to claim 1, wherein the determination unit determines a degree of a communication abnormality, based on a number of times that the first phase difference has exceeded the first phase difference threshold value within a predetermined time period.

5. The communication device according to claim 1, wherein the first phase difference threshold value is variable.

6. The communication device according to claim 1, further comprising:
a reception unit configured to receive a serial signal; and
a second phase difference determination unit configured to determine a second phase difference which is a phase difference between a second reference clock signal having a same period as a period of one bit of a serial reception signal that is the serial signal received by the reception unit, and an edge of the serial reception signal received by the reception unit;
wherein the determination unit determines that there is an abnormality in the serial reception signal received by the reception unit, in a case that the second phase difference has exceeded a second phase difference threshold value.

7. The communication device according to claim 6, further comprising a second decision unit configured to decision, as the second reference clock signal, one clock signal from among a plurality of clock signals each having a phase difference corresponding to a time period that is shorter than the period of one bit of the serial reception signal, periods of the plurality of clock signals being equal to each other.

8. The communication device according to claim 7, wherein the second decision unit decides, as the second reference clock signal, a clock signal positioned immediately before or immediately after the edge of the serial reception signal from among the plurality of clock signals.

9. The communication device according to claim 6, wherein the determination unit determines a cause of an abnormality in communication, based on a determination result determined by the first phase difference determination unit and a determination result determined by the second phase difference determination unit.

10. The communication device according to claim 9, wherein, in a case that the first phase difference has exceeded the first phase difference threshold value and the second phase difference has exceeded the second phase difference threshold value, the determination unit determines that a disturbance noise is included in the cause of the abnormality.

11. The communication device according to claim 9, wherein, in a case that the first phase difference has not exceeded the first phase difference threshold value and the second phase difference has exceeded the second phase difference threshold value, the determination unit determines that the cause of the abnormality is jitter.

12. The communication device according to claim 6, wherein the second phase difference threshold value is variable.

13. The communication device according to claim 6, wherein the determination unit determines a degree of a communication abnormality, based on a number of times that the second phase difference has exceeded the second phase difference threshold value within a predetermined time period.

14. An industrial machine comprising the communication device according to claim 1.

15. A communication quality determination method, comprising:
   a transmission step of transmitting a serial signal from a transmission unit;
   a first phase difference determination step of determining a first phase difference which is a phase difference between a first reference clock signal having a same period as a period of one bit of a serial transmission signal that is the serial signal transmitted in the transmission step, and an edge of the serial transmission signal transmitted from the transmission unit; and
   a determination step of determining that there is an abnormality in the serial transmission signal transmitted in the transmission step, in a case that the first phase difference has exceeded a first phase difference threshold value.

16. The communication quality determination method according to claim 15, further comprising:
   a reception step of receiving a serial signal by a reception unit; and
   a second phase difference determination step of determining a second phase difference which is a phase difference between a second reference clock signal having a same period as a period of one bit of a serial reception signal that is the serial signal received in the reception step, and an edge of the serial reception signal received by the reception unit;
   wherein, in the determination step, it is determined that there is an abnormality in the serial reception signal received by the reception unit, in a case that the second phase difference has exceeded a second phase difference threshold value.

17. The communication quality determination method according to claim 16, wherein, in the determination step, a cause of an abnormality in communication is determined, based on a determination result in the first phase difference determination step and a determination result in the second phase difference determination step.

* * * * *